(12) United States Patent
Wille et al.

(10) Patent No.: US 8,634,968 B2
(45) Date of Patent: Jan. 21, 2014

(54) COMMUNICATION SYSTEM FOR A MOTOR VEHICLE

(75) Inventors: Frank-Martin Wille, Gaimersheim (DE); Holger Esser, Ingolstadt (DE); Heinz-Willi Vassen, Buxheim (DE); Tobias Ammler, Unterstall (DE); Norbert Ammler, Bergheim (DE); Helmut Lebmeier, Langenmosen (DE); Yvonne Gross, Gaimersheim (DE); Hans-Christian Jung, Ingolstadt (DE); Rudolf Leinfelder, Eichstätt (DE); Jens Kötz, Eitensheim (DE); Carsten Krömke, Braunschweig (DE); Stefan Anderlik, Zellendorf (DE); Christian Penshorn, Edemissen (DE); Matthias Wenzel, Detmold (DE)

(73) Assignees: Audi AG, Ingolstadt (DE); Volkswagen AG, Wolfsburg (DE)

( * ) Notice: Subject to any disclaimer, the term of this patent is extended or adjusted under 35 U.S.C. 154(b) by 1823 days.

(21) Appl. No.: 10/593,458

(22) PCT Filed: Mar. 11, 2005

(86) PCT No.: PCT/EP2005/002573
§ 371 (c)(1),
(2), (4) Date: Sep. 19, 2006

(87) PCT Pub. No.: WO2005/093584
PCT Pub. Date: Oct. 6, 2005

(65) Prior Publication Data
US 2007/0208469 A1    Sep. 6, 2007

(30) Foreign Application Priority Data
Mar. 19, 2004  (DE) .......................... 10 2004 013 629

(51) Int. Cl.
*G06F 13/42*      (2006.01)

(52) U.S. Cl.
USPC .................. 701/1; 701/36; 710/100; 710/105; 370/229; 370/235; 370/237; 370/351; 370/389; 370/395.4; 370/395.42; 370/395.5; 370/395.72; 370/464; 370/466; 370/467

(58) Field of Classification Search
None
See application file for complete search history.

(56) References Cited

U.S. PATENT DOCUMENTS 4,519,068 A * 5/1985 Krebs et al. .................... 370/329
4,715,031 A * 12/1987 Crawford et al. ............. 370/462

(Continued)

FOREIGN PATENT DOCUMENTS

DE      41 07 745      6/1992
DE      41 40 864      6/1992

(Continued)

*Primary Examiner* — Jonathan M Dager
(74) *Attorney, Agent, or Firm* — Staas & Halsey LLP

(57) ABSTRACT

The invention relates to a communication system for a motor vehicle for transmitting an information relating to the operation of the motor vehicle from a transmitting control device to a receiving control device. The communication system comprises an interface for the input or output of the information relating to the operation of the motor vehicle. Communication can be established via the interface by means of a protocol which comprises an operation field for identifying a task to be carried out using the information relating to the operation of the motor vehicle.

36 Claims, 14 Drawing Sheets

(56) References Cited

U.S. PATENT DOCUMENTS

| | | | | |
|---|---|---|---|---|
| 4,951,281 | A * | 8/1990 | Muto et al. | 370/449 |
| 5,406,091 | A * | 4/1995 | Burba et al. | 250/551 |
| 5,418,526 | A * | 5/1995 | Crawford | 370/464 |
| 5,524,213 | A * | 6/1996 | Dais et al. | 709/207 |
| 5,640,400 | A * | 6/1997 | Sato et al. | 370/401 |
| 5,652,840 | A * | 7/1997 | Okamoto et al. | 709/245 |
| 5,668,880 | A * | 9/1997 | Alajajian | 370/342 |
| 5,748,923 | A * | 5/1998 | Eitrich | 710/305 |
| 5,856,976 | A * | 1/1999 | Hirano | 370/401 |
| 5,901,156 | A * | 5/1999 | Botzenhardt et al. | 714/748 |
| 6,023,232 | A * | 2/2000 | Eitzenberger | 340/988 |
| 6,185,484 | B1 | 2/2001 | Rhinehart | |
| 6,430,164 | B1 * | 8/2002 | Jones et al. | 370/313 |
| 6,434,459 | B2 * | 8/2002 | Wong et al. | 701/36 |
| 6,526,460 | B1 * | 2/2003 | Dauner et al. | 710/65 |
| 6,865,460 | B2 * | 3/2005 | Bray et al. | 701/36 |
| 6,885,916 | B2 * | 4/2005 | Remboski et al. | 701/1 |
| 7,433,354 | B2 * | 10/2008 | Scherer et al. | 370/389 |
| 7,532,640 | B2 * | 5/2009 | Kelly et al. | 370/466 |
| 7,570,597 | B2 * | 8/2009 | Remboski et al. | 370/248 |
| 7,813,359 | B1 * | 10/2010 | Yamawaki | 370/402 |
| 2002/0003781 | A1 * | 1/2002 | Kikkawa et al. | 370/254 |
| 2002/0046309 | A1 * | 4/2002 | Boesinger et al. | 710/100 |
| 2003/0083079 | A1 | 5/2003 | Clark et al. | |
| 2004/0122978 | A1 * | 6/2004 | Bird | 709/246 |
| 2005/0002417 | A1 * | 1/2005 | Kelly et al. | 370/466 |

FOREIGN PATENT DOCUMENTS

| | | |
|---|---|---|
| DE | 44 01 785 | 7/1994 |
| DE | 44 44 443 | 6/1996 |
| DE | 195 07 997 | 9/1996 |
| DE | 196 04 351 | 8/1997 |
| DE | 197 06 719 | 8/1998 |
| DE | 197 23 840 | 12/1998 |
| DE | 197 42 088 | 3/1999 |
| DE | 198 14 904 | 10/1999 |
| DE | 198 50 454 | 5/2000 |
| DE | 198 43 509 | 6/2000 |
| DE | 199 19 216 | 11/2000 |
| DE | 100 44 891 | 3/2002 |
| DE | 100 44 892 | 3/2002 |
| DE | 101 37 858 | 2/2003 |
| EP | 0 701 926 | 8/1995 |
| EP | 0 797 881 | 12/1995 |
| EP | 0 849 661 | 12/1997 |
| EP | 0 862 296 | 1/1998 |
| EP | 0 978 433 | 8/1999 |
| EP | 0994418 A1 | 4/2000 |
| EP | 1 136 325 | 3/2001 |

* cited by examiner

COMMUNICATION SYSTEM FOR A MOTOR VEHICLE

This application is a U.S. National Stage of PCT/EP2005/002573, having been filed Mar. 11, 2005, which claims priority from DE 1020040013629.7, having been filed on Mar. 19, 2004, each of which is incorporated by reference in its entirety.

The invention relates to a communications system for a motor vehicle for transmission of information relating to operation of the motor vehicle from a sending control device to a receiving control device.

DE 100 44 892 A1 discloses a process for operating a multifunctional display unit in a motor vehicle in which by selection of a menu item one respective function or one respective parameter at a time is displayed or re-displayed, the data contents or messages of different assemblies in the motor vehicle being stored in a control device which corresponds bidirectionally with the display unit, and a priority value which is send back cyclically to the control device having been assigned or being assigned to the currently selected display, so that different data contents displayed again only when such contents are selected separately or have a higher priority value.

DE 100 44 891 A1 discloses a process for operating a multifunctional, menu-driven display unit in a motor vehicle in which by selection of a menu item one respective function or one respective parameter at a time is displayed or re-displayed, the data contents of the displays of different assemblies in the motor vehicle being stored referenced to the function and/or assembly in a control device which corresponds bidirectionally with the display unit, when the menu item is selected only one header line of the memory contents being displayed, and all the memory contents referenced to the header line being transmitted and displayed subsequently by corresponding key actuation. In this connection a bidirectional question/answer link between the control device and the display means can be set up or maintained by a menu selection. The desired function or parameter display can be selected for example by a scroll function (scroll up/scroll down).

The object of the invention is to reduce the costs in production of a motor vehicle.

This object is achieved by a communications system for a motor vehicle for transmission of information relating to operation of the motor vehicle from a sending (located on the motor vehicle) control device to a receiving (located on the motor vehicle) control device, the communications system comprising an interface for input and/or output of the information relating to vehicle operation, and communications being possible by way of the interface, especially only by means of a protocol which comprises an operation field for identification of a task to be performed by means of the information relating to operation of a motor vehicle.

In an advantageous embodiment of the invention the protocol comprises a data field with a value for the information relating to operation of the motor vehicle. Provision can be made such that the data field can be empty or omitted depending on the contents of the operation field.

In a furthermore advantageous configuration of the invention the protocol comprises an ID field for identification of the information relating to operation of the vehicle.

In an optional configuration of the invention, the operation field comprises information which indicates whether the protocol relates to a message to be sent or a received message. The protocol can also comprise an information field for identification of a message to be sent or a received message. Whether it is a message to be sent or a received message however derives especially from the context, it being possible to omit the information of the information field as a component of the protocol or of the operation field.

In a furthermore advantageous configuration of the invention the protocol comprises at most the operation field, the data field, and the ID field as important information. Empty or redundancy information for bypassing this feature should advantageously also be encompassed.

In a furthermore advantageous configuration of the invention the ID field designates a function which is assigned to the information relating to operation of the vehicle and/or produced and/or processed from the information relating to operation of the vehicle. This function can be for example the function 'automatic air conditioning.' The identification of the information relating to operation of the vehicle as another component of the ID field can be for example a setpoint temperature for the interior of the motor vehicle in the area of the driver's seat.

In an especially advantageous configuration of the invention, the protocol does not comprise the designation of the sending control device and/or the designation of the receiving control device. This designation labels the hardware and can be distinguished from a function such as for example 'automatic air conditioning'. Designation of the sending control device and/or of the receiving control device is for example control device with address 01001001. The designation of the 'automatic air conditioning' function is however dependent on whether the function 'automatic air conditioning' is implemented on the control device with the address 01001001 or the control device with the address 01001111. In an especially advantageous configuration of the invention the contents of the ID field are independent of whether there is transmission from the sending control device to the receiving control device or vice versa.

In a furthermore advantageous configuration of the invention the operation field can comprise the following as an allowable entry a request to send the current value of the information relating to operation of the vehicle, a prompt to change the information relating to operation of the vehicle, a prompt to confirm a change of the information relating to operation of the vehicle, identification of sending of the current value of the information relating to operation of the vehicle, identification of restart of a function assigned to the information relating to operation of the vehicle and/or identification of an error to be assigned to the information relating to operation of the vehicle.

In a furthermore advantageous configuration of the invention the communications system comprises a memory for storage of the information relating to operation of the vehicle. This memory enables the application of specifically reading out the individual data relating to operation of the vehicle. This memory can be distinguished from an input/output buffer, for example for segmenting of messages or for combining segmented messages.

The aforementioned object is moreover achieved in conjunction with the aforementioned advantageous configurations by a communications system for a motor vehicle for transmission of the information relating to operation of the vehicle from a sending control device to a receiving control device, the communications system comprising a bus system and an interface which is independent of the configuration of the bus system for input of the information relating to operation of the vehicle transmitted by way of the bus system and/or output of the information relating to operation of the vehicle to be transmitted by way of the bus system.

In an advantageous configuration of the invention, by way of the bus system a bus protocol is transmitted which is composed essentially of an interface protocol of the interface and especially prefixed data which are specific to the bus system.

The aforementioned object is moreover achieved in conjunction with the aforementioned advantageous configurations by a communications system for a motor vehicle for transmission of the information relating to operation of the vehicle from a first (located on the motor vehicle) control device to a second (located on the vehicle) control device, the communications system comprising an interface for input and/or output of the information relating to operation of the motor vehicle, by way of the interface communications being possible only by means of a protocol which comprises an ID field for identification of a function which is assigned to the information relating to operation of the vehicle, the contents of the ID field being independent of whether transmission takes place from the first control device to the second control device or vice versa. In an advantageous configuration of the invention the protocol does not comprise any address information (in addition) for addressing the first or the second control device.

The aforementioned object is moreover achieved in conjunction with the aforementioned advantageous embodiments by a control module for control of a function of the motor vehicle and/or for especially optical and/or acoustic output of the information relating to operation of the vehicle, the control module comprising an interface for input and/or output of the information relating to operation of the vehicle, communications being possible by way of an interface, especially only by means of a protocol which comprises an operation field for identification of the task to be performed by means of the information relating to operation of the vehicle.

The aforementioned object is moreover achieved in conjunction with the aforementioned advantageous embodiments by a control module for control of a function of the motor vehicle and/or for especially optical and/or acoustic output of the information relating to operation of the vehicle, the control module comprising an interface for input and output of the information relating to operation of the vehicle, communications being possible by way of an interface, especially only by means of a protocol which comprises an ID field for identification of the function which is assigned to the information relating to operation of the vehicle, the contents of the ID field being independent of whether the information is being sent or received by the control module. In an advantageous configuration of the invention the protocol does not comprise any address information (in addition) for addressing the control module or a communications partner.

A motor vehicle for the purpose of this invention is especially a ground vehicle which can be used individually in road traffic. Motor vehicles for the purpose of the invention are especially not limited to ground vehicles with internal combustion engines.

Other advantages and details will become apparent from the following description of embodiments.

Figure 4:
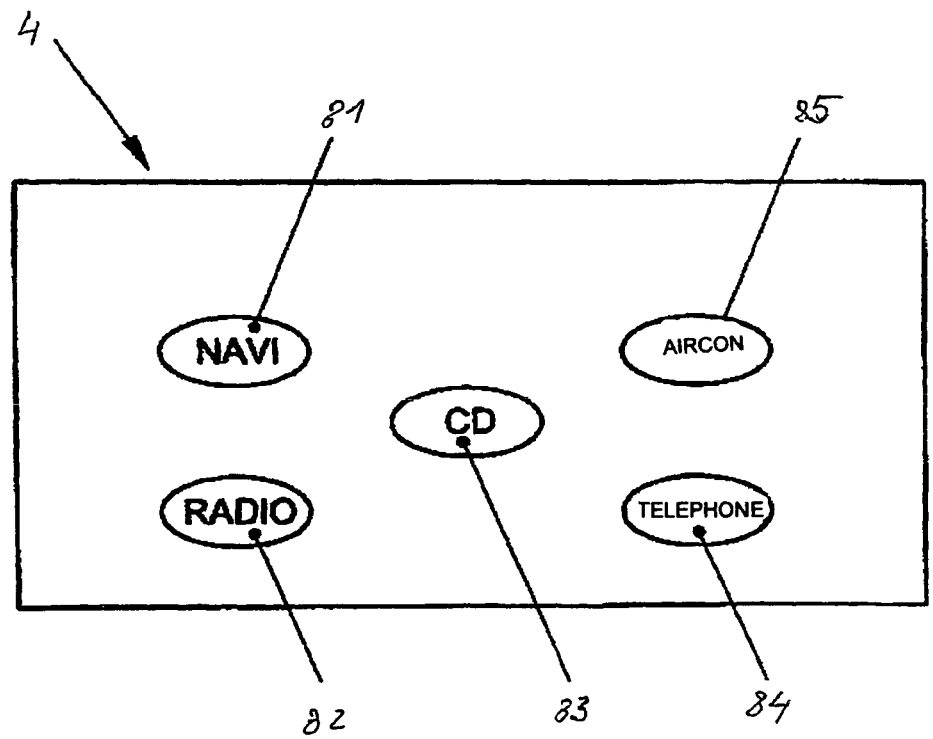
Figure 5:
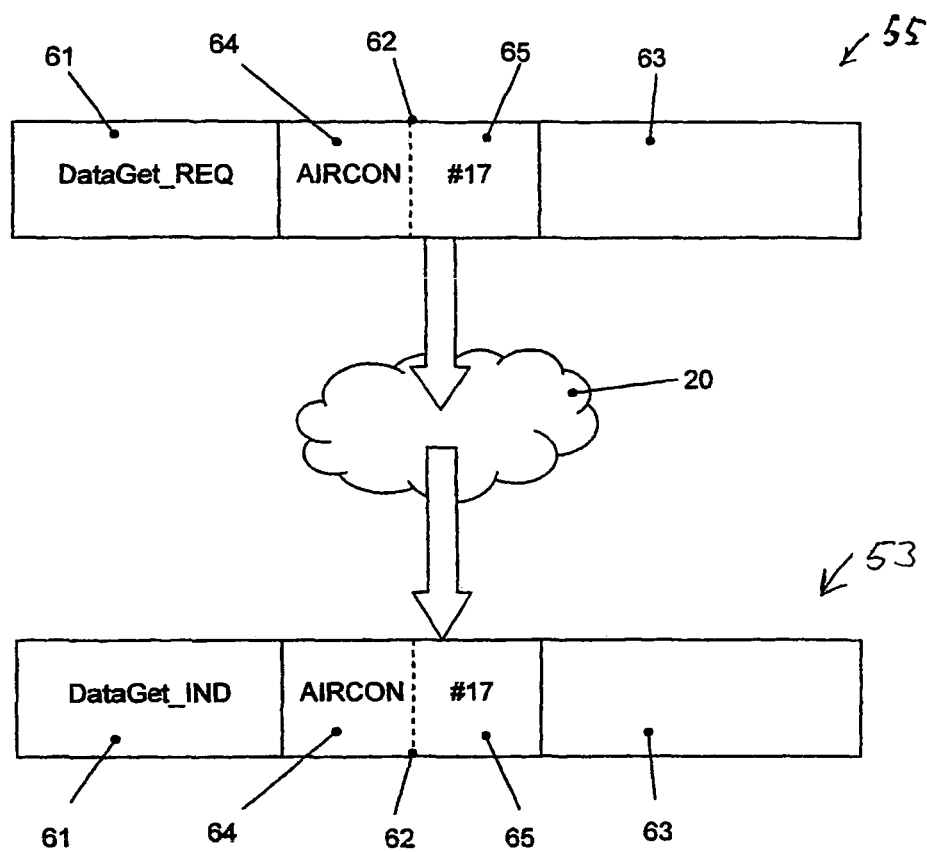
Figure 6:
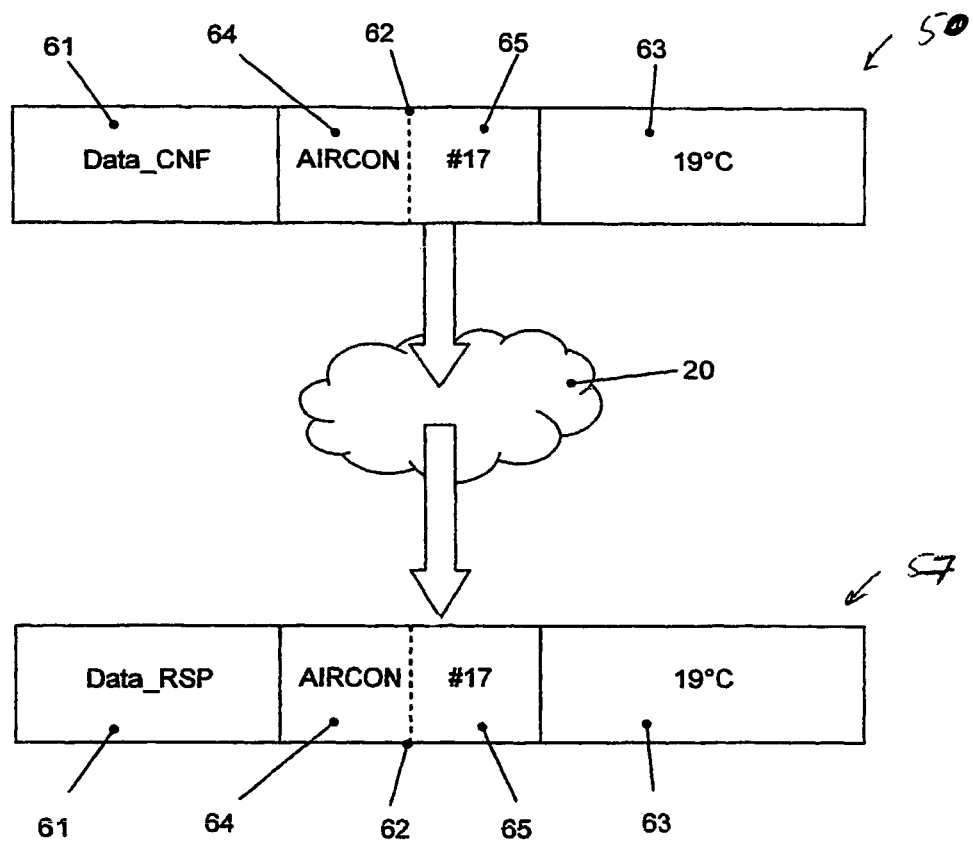
Figure 7:
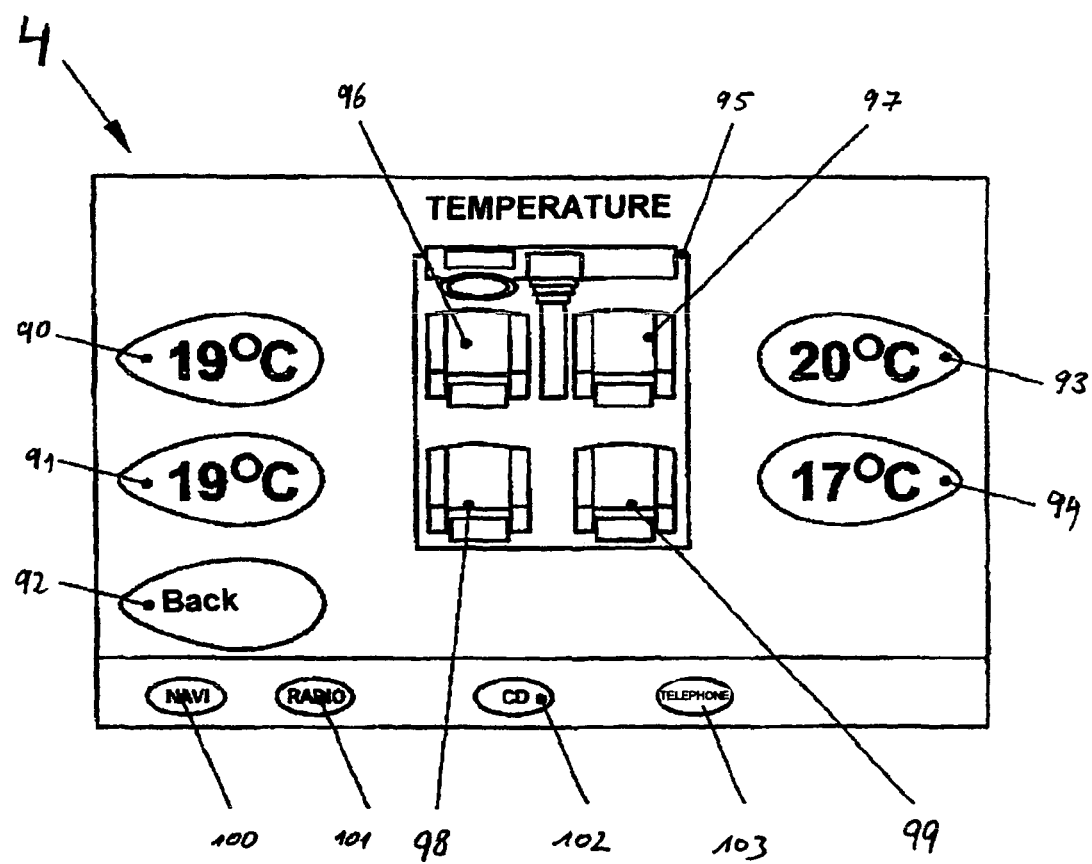
Figure 8:
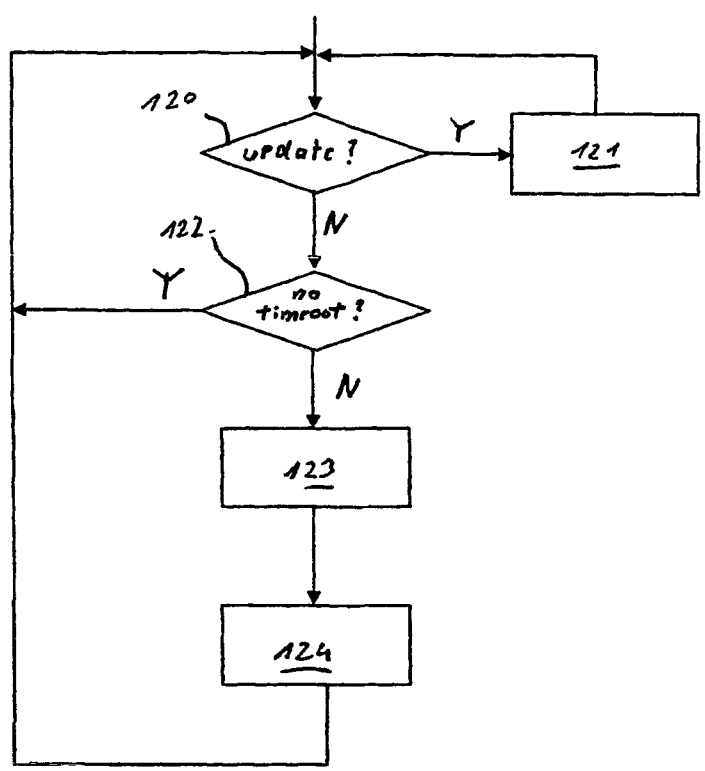
Figure 9:
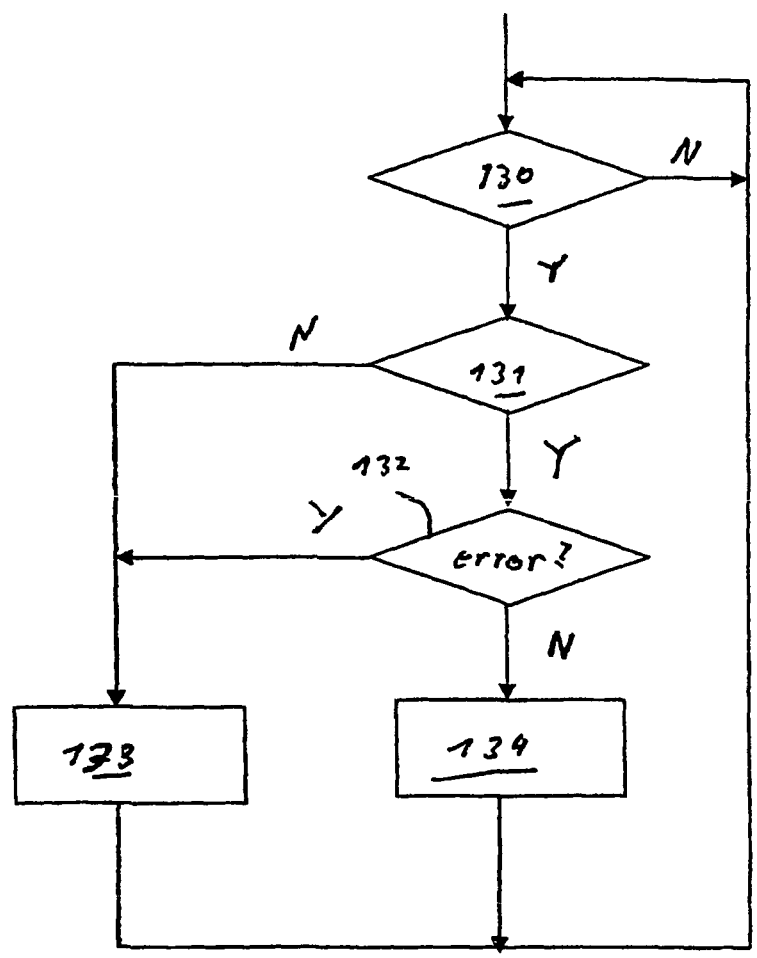
Figure 10:
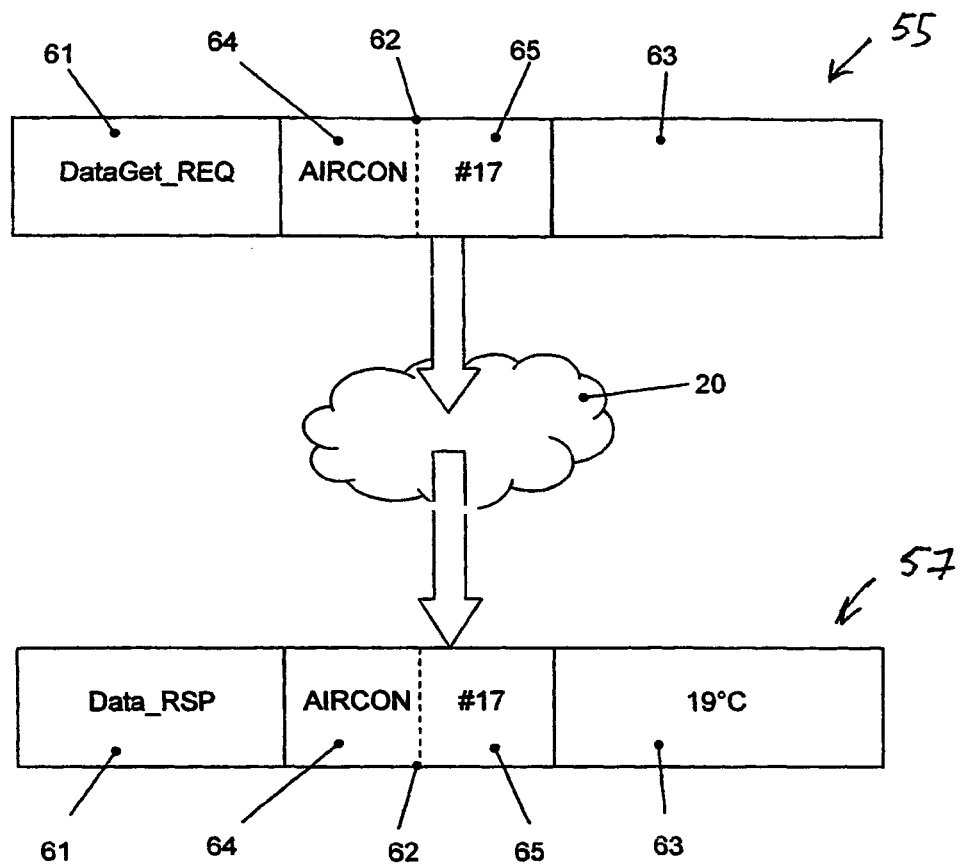
Figure 11:
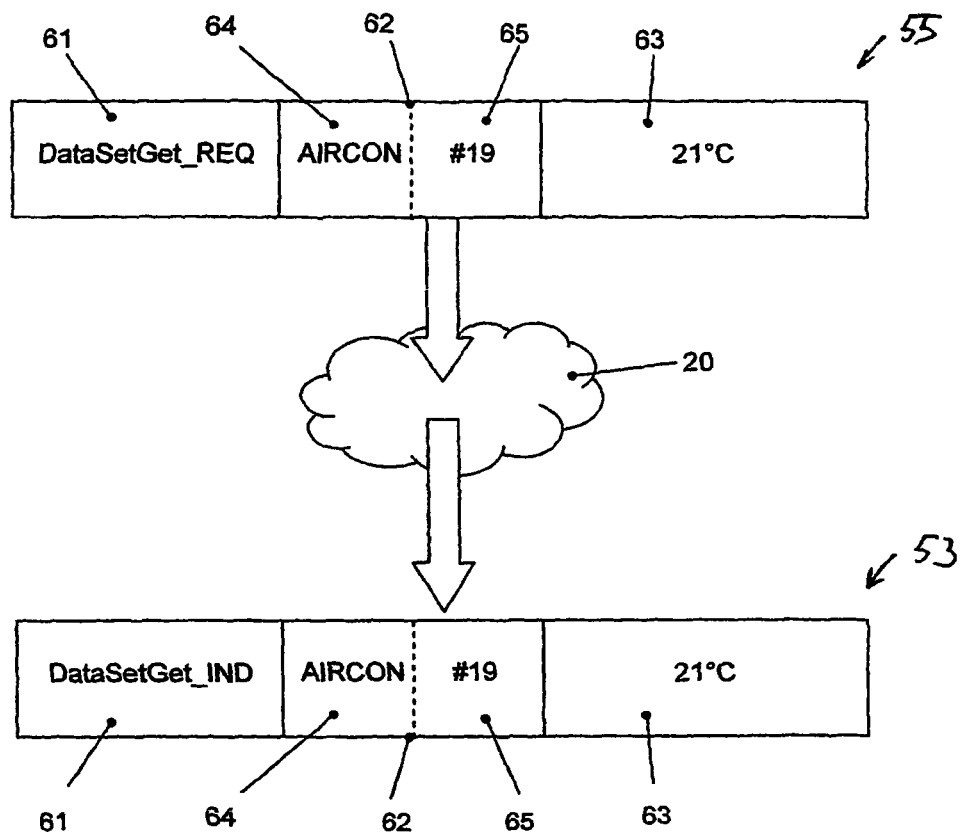
Figure 12:
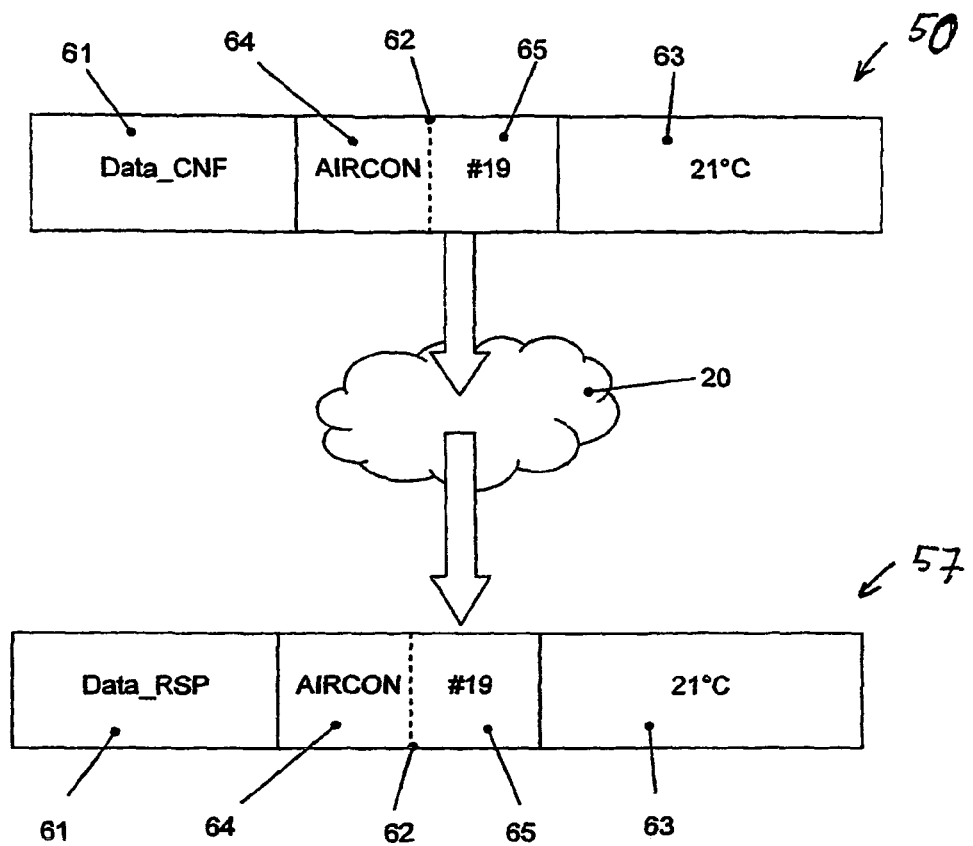
Figure 13:
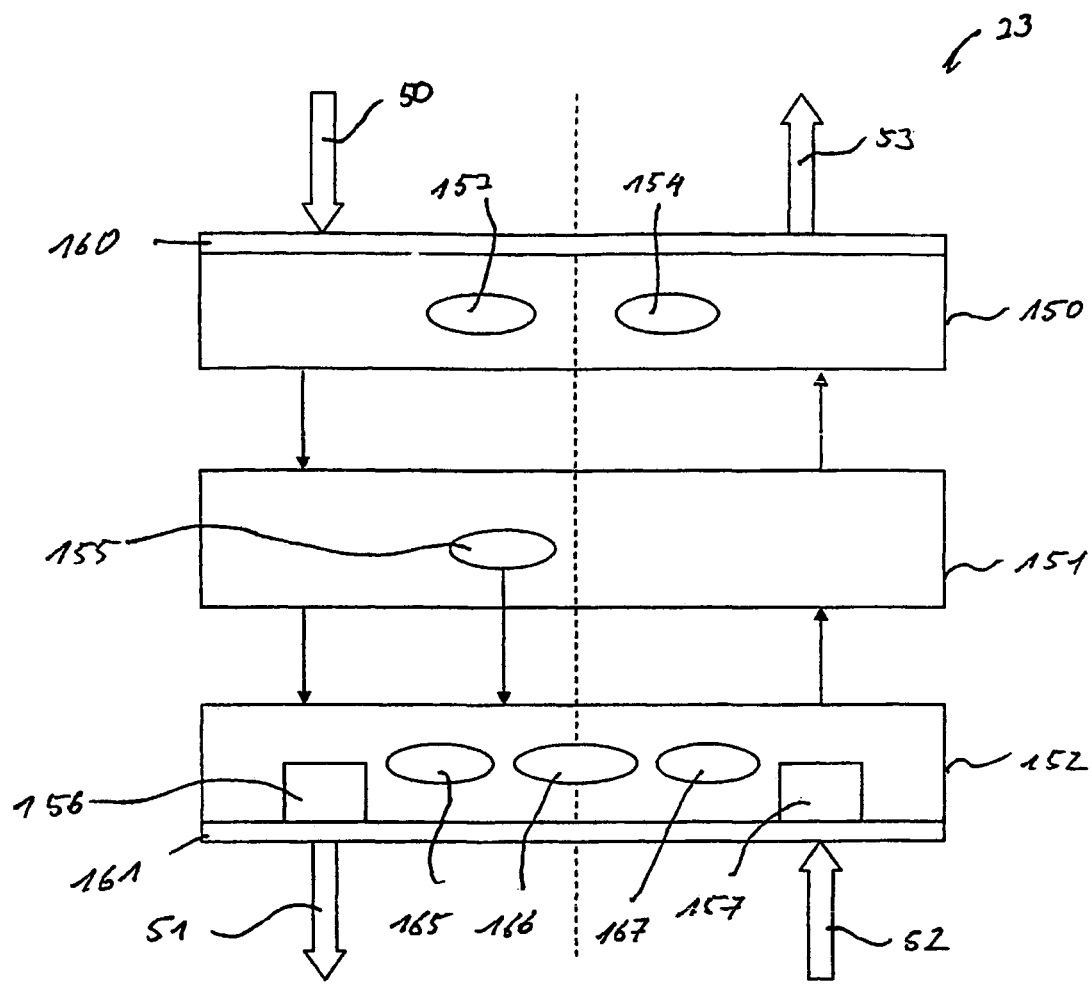
Figure 14:
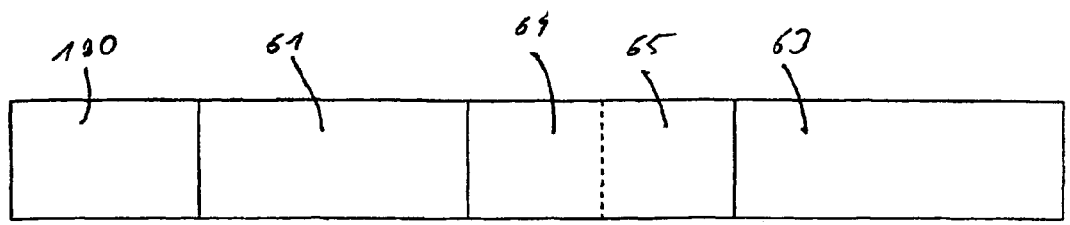
Figure 15:
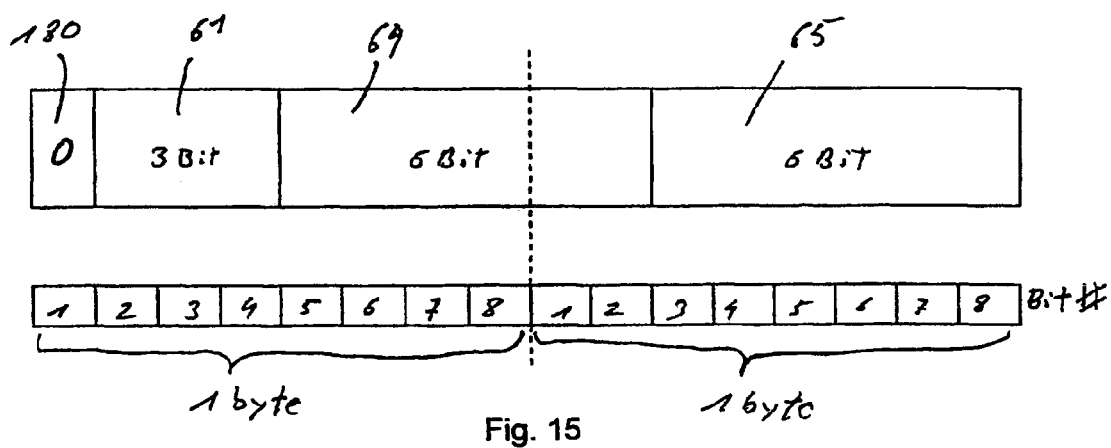
Figure 16:
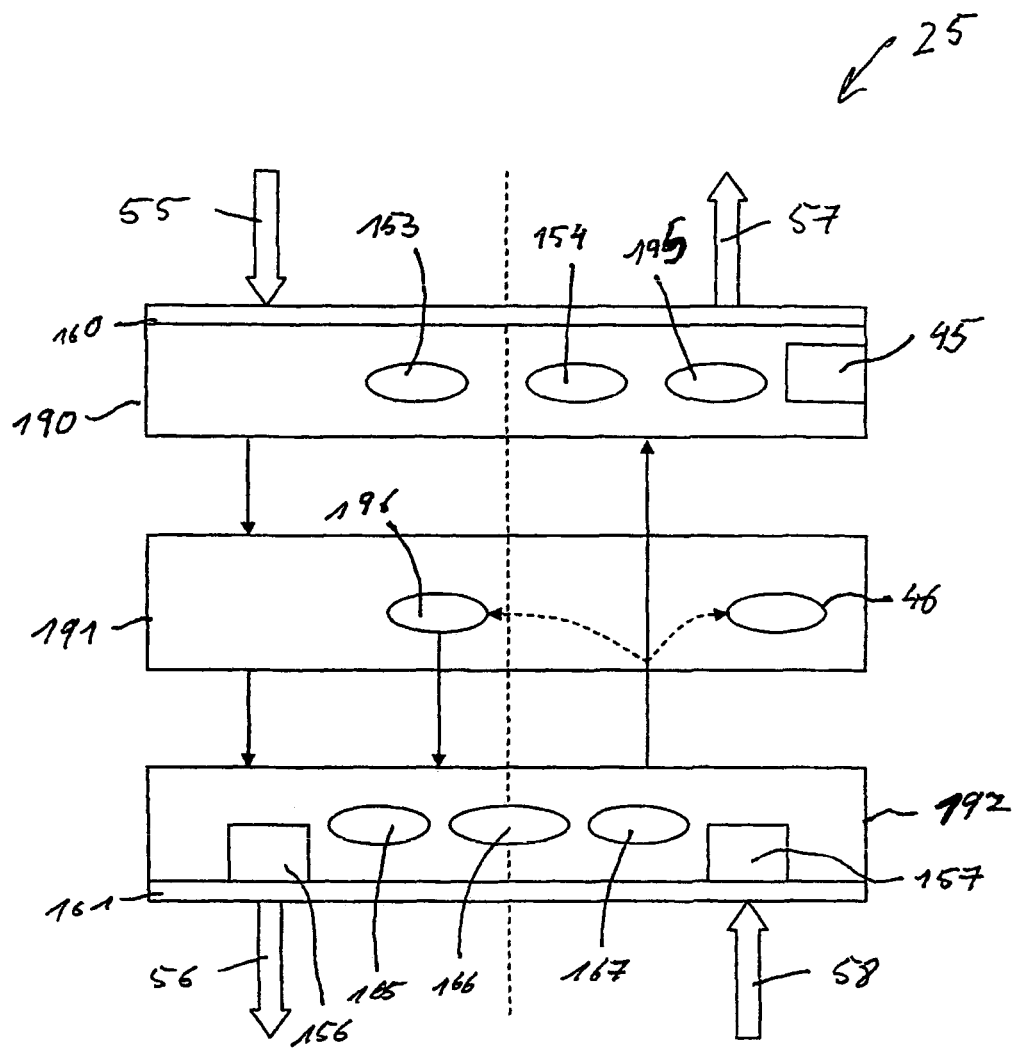

FIG. 4 shows an embodiment for a basic mask which is displayed by means of an input device, FIG. 5 shows a sample information flow, FIG. 6 shows a sample information flow, FIG. 7 shows an embodiment for a mask for operation of an air conditioning system, FIG. 8 shows an embodiment for a monitoring module, FIG. 9 shows an embodiment for a sequence implemented in the interface module, FIG. 10 shows a sample information flow, FIG. 11 shows a sample information flow, FIG. 12 shows a sample information flow, FIG. 13 shows an embodiment for a logic function control unit, FIG. 14 shows an embodiment for a bus protocol, FIG. 15 shows an embodiment for a bus protocol, and FIG. 16 shows an embodiment for a logic output control unit.

Figure 1:
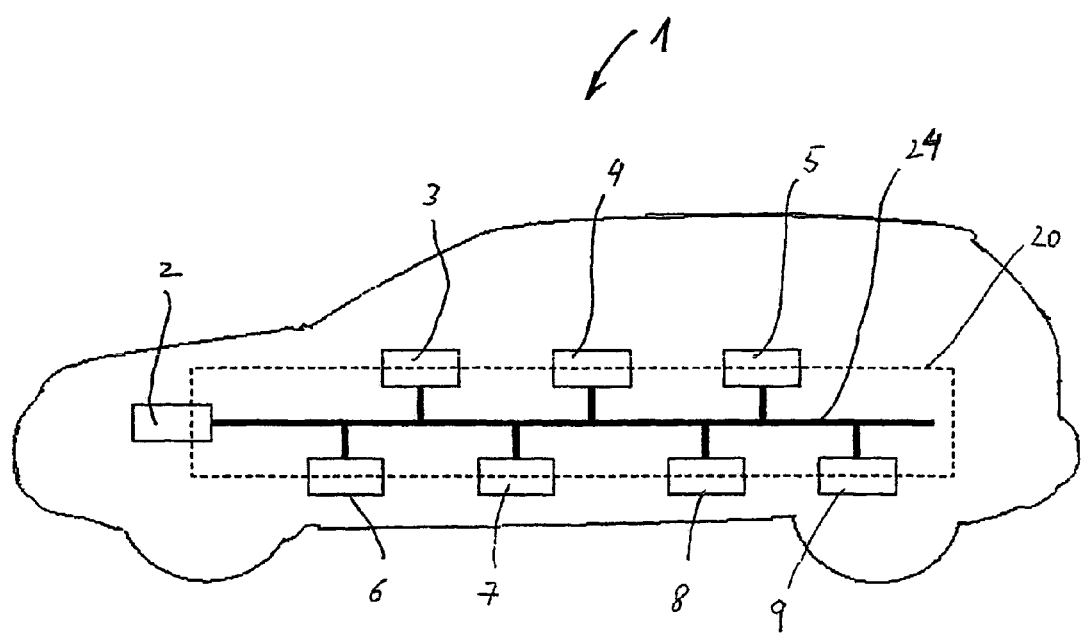
FIG. 1 shows an embodiment for a motor vehicle.

FIG. 1 shows an embodiment for a motor vehicle 1 in a schematic view. The motor vehicle 1 has an engine control 2, a combination display 3 for display of speed, engine rpm, cooling water temperature, and the like, a multifunction display device 4 with a touchscreen for operation of an air conditioning system 6, a navigation system 7, a music module 8, a telephone module 9 and an acoustic output device 5. The engine control 2, the combination display 3, the multifunction display device 4, the output device 5, the air conditioning system 6, the navigation system 7, the music module 8 and/or the telephone module 9 are connected for exchange of data and information by way of a bus system 24 as a component of a communications system 20. The air conditioning system 6, the navigation system 7, the music module 8 and the telephone module 9 can, as shown in FIG. 1, be implemented each on separate hardware. But they can also all or partially be implemented on common hardware.

Figure 2:
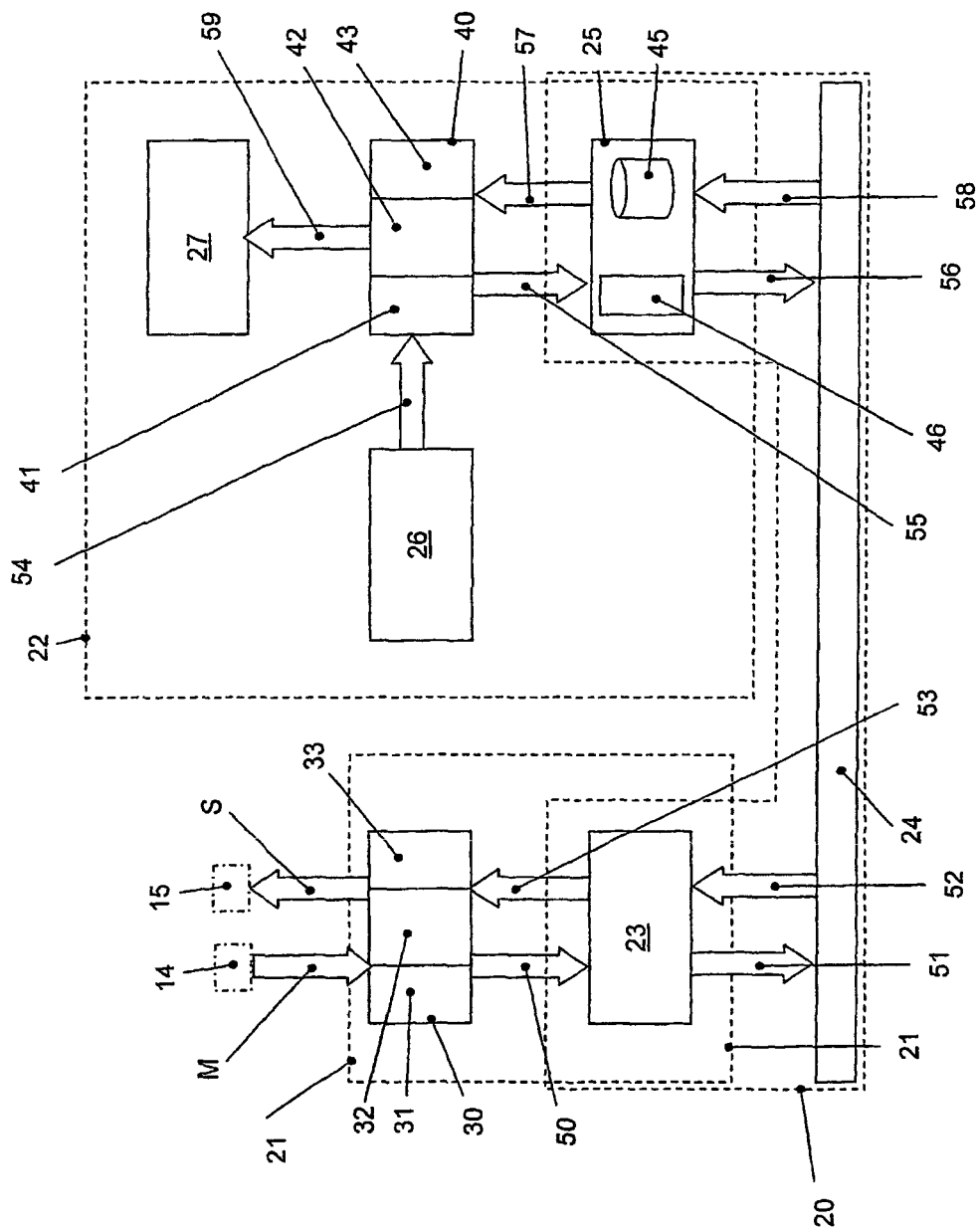
FIG. 2 shows an embodiment for a communications system.

FIG. 2 shows a detailed configuration of the communications system 20 and its interaction with individual control devices 21 and 22. Here reference number 21 designates a function control for producing or making available information relating to operation of the vehicle and reference number 22 designates an output control which is spatially separated from the function control 21. The information relating to operation of the vehicle can be for example the engine rpm, oil pressure, coolant temperature, vehicle tilt, distance to an obstacle, interior temperature, a radio transmitter located in the receiving area of the motor vehicle 1, the geographical location of the motor vehicle 1, the closing state of the doors, the current time, a telephone book entry, a control command for moving an actuator 15 and/or a selected music title. The function control 21 can correspond to the engine control, the air conditioning system 6, the navigation system 7, the music module 8 and/or the telephone module 9. The output control 22 can correspond to the combination display 3, the multifunction display device 4 and/or (with the corresponding modifications) the acoustic output device 5. The information relating to operation of the vehicle can be transmitted by means of the communications system 20 or physically by means of the bus systems 24 from the function control 21 to the output control 22.

The function control 21 comprises a logic function control device 30 which has function modules 31, 32, 33 for controlling the functions of the motor vehicle 1, for example by means of the control of actuators 15 by producing control signals S and by reading-in measurement signals M generated by the sensors 14. This control signal S can be an electrical signal corresponding to a setpoint temperature for a cooling device. A measurement signal M can be an electrical signal which corresponds to a measured current temperature. This current temperature can be information relating to operation of the vehicle 1 as defined in the claims. But the aforementioned setpoint temperature can also be information relating to operation of the vehicle 1 as defined in the claims. The function control part 30 is thus used for actually generating or making available information relating to operation of the vehicle 1.

The logic function control device 30 is an embodiment for a function assigned to the information relating to operation of the vehicle as defined in the claims. The function control 21 can also comprise several logic function control devices. The logic function control device 30 can be for example the actual functionality of the engine control 2, the air conditioning system 6, the navigation system 7, the music module 8 and/or the telephone module 9.

The output control 22 comprises a display 27 for optical display of information relating to operation of the vehicle, such as the engine rpm, oil pressure, coolant temperature, vehicle tilt, distance to an obstacle, interior temperature, a radio transmitter located in the receiving area of the motor vehicle 1, the geographical location of the motor vehicle 1, the closing state of the doors, the current time, a telephone book entry, and/or a selected music title. To actuate the display 27 the output control 22 comprises a logic output control device 40 which has function modules 41, 42, 43, a display control signal 59 being output from the logic output control device 40.

Moreover in this embodiment the output control 22 comprises an input device 26 for input of a request for optical display of operation of information relating to operation of the vehicle 1 and for output of a corresponding request signal 54. The input device 26 can be a component of the output control 22, as in this embodiment. But the input device 26 can also comprise for example control elements located next to the display 27. The input device 26 can also comprise a touchscreen located on the display 27. The input device 26 can moreover be located spatially from the output control 22 and can simply be assigned to it.

The logic output control device 40 is an embodiment for a function assigned to information relating to operation of the vehicle as defined in the claims. The output control 22 can also comprises several logic output control devices. One output control device 40 can be for example the actual computer functionality of the combination display 3, the multifunction display device 4 and/or the acoustic output device 5 (with a corresponding modification).

The communications system 20 comprises an interface module 23 for translation of information 50 which has been output from the logic function control device 30 into information 51 in the transmission format of the bus system 24 and/or for translation of information in the transmission format of the bus system 24 into information 53 which can be read in by the logic function control device 30. The communications system 20 moreover comprises an interface module 25 for translation of information 55 output from the logic output control device 40 into information 56 in the transmission format of the bus system 24 and/or for translation of information 58 in the transmission format of the bus system 24 into information 57 which can be read in by the logic function control device 30.

Figure 3:
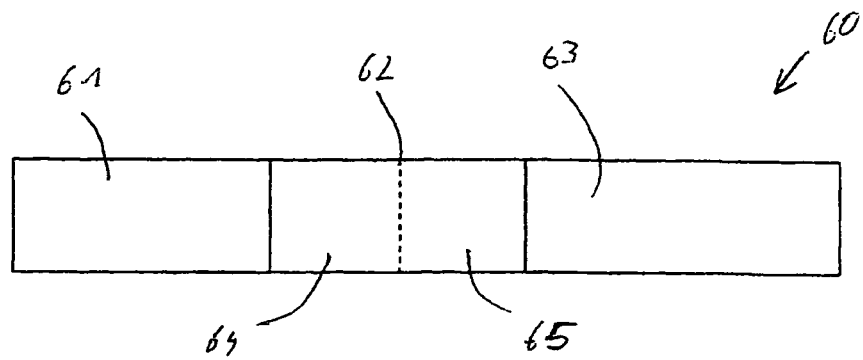
FIG. 3 shows an embodiment for an interface protocol.

The information 50, 53, 55 and 57 is transmitted according to the interface protocol 60 shown in FIG. 3. The interface protocol 60 is composed of an operation field 61 for identification of a task to be performed (optionally with information relating to operation of the vehicle), an ID field 62 for designating the logic control device 21 or 22, to which the information relating to operation of the vehicle is assigned, and for identification of the information relating to operation of the vehicle and a data field 63 with a value for the information relating to operation of the vehicle. Provision can be made such that the data field 63 can be empty or omitted depending on the contents of the operation field. The ID field 62 comprises a first region 64 for designating the logic control device 21 or 22, to which the information relating to operation of the vehicle is assigned, and a second region 65 for identification of the information relating to operation of the vehicle.

In this embodiment the operation field 61 comprises 3 bits, the ID field 62 two times 6 bits (6 bits per region) and the data field 63 up to 28656 bits.

Identification of the information relating to operation of the vehicle and especially identification of the information relating to operation of the vehicle as defined in the claims can comprise a designation such as the output temperature or designation of a function module 31, 32, 33, 41, 42, 43 in which the information relating to operation of the vehicle is 'processed.' If several items of information relating to operation of the vehicle are 'processed' in a function module 31, 32, 33, 41, 42, and 43, this information relating to operation of the vehicle is combined in an array and fundamentally transmitted together.

The interface protocol 60 is independent of the configuration of the bus system 24. Thus the bus system 24 can be a CAN bus system, a MOST bus system, a LIN bus system and the like. The interface protocol 60 is unaffected by this specific configuration.

The operation field 61 can comprise the following as an allowable entry, for example
- a request to send the current value of the information relating to operation of the vehicle,
- a prompt to change the information relating to operation of the vehicle,
- a prompt to confirm a change of the information relating to operation of the vehicle,
- identification of the sending of the current value of the information relating to operation of the vehicle,
- identification of restart of a function assigned to the information relating to operation of the vehicle and/or
- identification of an error to be assigned to the information relating to operation of the vehicle.

In this embodiment, for the operation field 61 the allowable entries are the DataSetGet_REQ, DataSet_REQ, DataGet_REQ, Start_REQ, StartResult_REQ, AbortResult_REQ, Data_CNF, Processing_REQ, Result_REQ, Changed_REQ and Error_REQ and the indications are DataSetGet_IND, DataSet_IND, DataGet_IND, Start_IND, StartResult_IND, AbortResult_IND, Data_RSP, Processing_IND, Result_IND, Changed_IND, Reset_IND and Error_IND. Here a request denotes an outgoing message and indication denotes an incoming message.

With the DataSetGet_REQ request (sender: logic output control device 40) new (setpoint) values are transmitted to the addressed logic function control device 30 and the function module 31, 32, 33. With this request, values can be changed, that is, new values set. Data are always transmitted to the pertinent control device via the bus system 24. The logic function control device 30 sends back any current information.

With the DataSet_REQ request (sender: logic output control device 40) new (setpoint) values are transmitted to the addressed logic function control device 30 and the function module 31, 32, 33. With this request, values can be changed, that is, new values set. Data are always transmitted to the pertinent control device via the bus system 24. The logic function control device 30 however does not send back any current information (in terms of an answer).

With the DataGet_REQ request (sender: logic output control device 40) the current values are read by the addressed logic function control device 30 and the function module 31, 32, 33. Data are always transmitted from the pertinent control device via the bus system 24.

With the Start_REQ request (sender: logic output control device 40) it is communicated to the addressed logic function control device 30 and the function module 31, 32, 33 that a certain movement of the actuator 15 is to be executed. Optionally parameters can be transferred. Data are always transmitted to the pertinent control device via the bus system 24.

The StartResult_REQ request (sender: logic output control device 40) behaves like the Start_REQ request with the difference that in this movement of the actuator 15 a result is expected. The result is monitored in time by the logic output control device 40 and can be prolonged by the logic function control device 30 with the Processing_REQ.

When movement of the actuator 15 is to be interrupted, with the AbortResult_REQ request (sender: logic output control device 40) this information can be transmitted to the logic function control device 30. The result is monitored in time by the logic output control device 40 and can be prolonged by the logic function control device 30 with the Processing_REQ.

With the Data_CNF request (sender: logic function control device 30) the addressed function control device 30 answers and sends the requested data back to the logic output control device 40.

With the Processing_REQ request (sender: logic function control device 30) the function control device 30 can communicate to the logic output control device 40 that the requested action is still being processed. A parameter (StartResult/AbortResult) can be added to the request so that the receiver can distinguish between StartResult and AbortResult.

With the Result_REQ request (sender: logic function control device 30) the function control device 30 communicates to the logic output control device 40 the result of the requested action.

With the Changed_REQ request (sender: logic function control device 30) the function control device 30 communicates to the logic output control device 40 that entries have changed in an array.

With the Error_REQ request (sender: logic function control device 30) a function control device 30 can communicate its error state or error value to the logic output control device 40.

With the DataSetGet_IND indication (recipient: logic function control device 30) it is indicated to the function control device 30 that the addressed data values are to be changed and that an answer with the current values was requested.

With the DataSet_IND indication (recipient: logic function control device 30) it is indicated to the function control device 30 that the addressed data values are to be changed and that an answer with the current values has not been requested.

With the DataGet_IND indication (recipient: logic function control device 30) it is indicated to the function control device 30 that the addressed data values are requested by the logic output control device 40. The function control device 30 must be answered with a Data_CNF.

With the Start_IND indication (recipient: logic function control device 30) it is signaled to the function control device 30 that the addressed movement of the actuator 15 is to be started.

With the StartResult_IND indication (recipient: logic function control device 30) it is signaled to the function control device 30 that the addressed movement of the actuator 15 is to be started. If the motion of the actuator 15 does not immediately deliver a result, answering should be done with Processing_REQ (otherwise with Result_REQ).

With the AbortResult_IND indication (recipient: logic function control device 30) it is signaled to the function control device 30 that the addressed movement of the actuator 15 is to be interrupted. The result should be delivered to the logic output control device 40 with the Result_REQ request.

With the Data_RSP indication (recipient: logic output control device 40) in the logic output control device 40 the result of a data request is signaled by a DataGet_REQ or a DataSetGet_REQ.

With the Processing_IND indication (recipient: logic output control device 40) it is signaled to the logic output control device 40 that the addressed movement of the actuator 15 has been started, but the result is not yet present and is being processed.

With the Result_IND indication (recipient: logic output control device 40) it is signaled to the logic output control device 40 that the addressed movement of the actuator 15 has been executed and the result of this action is herewith communicated.

With the Changed_IND indication (recipient: logic output control device 40) it is signaled to the logic output control device 40 that entries have changed in the addressed array.

With the Reset_IND indication (recipient: logic output control device 40) it is signaled to the logic output control device 40 that the addressed control device is being restarted or has been reset. The displayed data are thus invalid and the data of the information memory 45 relating to this control device should be set to the corresponding default values.

With the Error_IND indication (recipient: logic output control device 40) the case of an error of the logic function control device 30 is signaled.

One simple example for information exchange between the logic function control device 30 and the local output control device 40 is explained with reference to FIG. 4, FIG. 5, FIG. 6, and FIG. 7, using the example of interaction between the air conditioning system 6 as an embodiment of the sample logic function control device 30 and the multifunction display device 4 which in the embodiment underlying FIG. 4 and FIG. 7 comprises a touchscreen located on the display which constitutes a sample configuration of the logic output control device 40.

FIG. 4 shows the multifunction display device 4 in a state which displays a base mask. Here the multifunction display device 4 displays five control elements 81, 82, 83, 84 and 85 executed by ellipses. By touching or pressing the control element 81 in FIG. 4 a mask for operation of the navigation system is called up, by touching or pressing the control element 82 in FIG. 4 a mask for operation of a radio (as part of the music module 8) is called up, by touching or pressing the control element 83 in FIG. 4 a mask for operation of a CD player (as part of the music module 8) is called up, and by touching or pressing the control element 84 in FIG. 4 a mask for operation of the telephone module 9 is called up.

By touching or pressing the control element 85 in FIG. 4 the mask shown in FIG. 7 for operation of the air conditioning system 6 is called up. For this purpose, a logic output control device 'Display control' implemented on the multifunction display device 4, as shown in FIG. 5, sends information 55 in the interface protocol 60 explained in FIG. 3. In this connection the operation field 61 contains the entry DataGet_REQ as a prompt to send the information specified in the ID field 62. The ID field 62 contains an entry AIRCON which names the logic function control device 'automatic air conditioning' implemented on the air conditioning system 6 as the 'owner' of the information. Moreover, the ID field 62 contains an entry #17 which designates the setpoint temperature in the interior of the vehicle 1 in the region of the driver's seat. The data field 63 is empty or omitted. The information 55 is received as information 53 from the logic function control device 'automatic air conditioning.' In this connection the operation field 61 contains an entry DataGet_IND as the prompt to send information specified in the ID field 62. DataGet_IND and DataGet_REQ can have the same code and thus cannot be distinguished from one another.

As the reaction, the information 50 shown in FIG. 6 in the interface protocol 60 explained in FIG. 3 is sent from the logic function control device 'automatic air conditioning.' Here the operation field 61 contains an entry Data_CNF which identifies the information 50 as information for data transmission. The ID field 62 contains the AIRCON entry which names a logic function control device 'automatic air conditioning' implemented on the air conditioning system 6 as the "owner" of the information. Moreover the ID field 62 contains an entry #17 which designates the setpoint temperature in the interior of the vehicle 1 in the region of the driver's seat. The data field 63 contains the value '19° C.' as the set value for the setpoint temperature in the interior of the vehicle 1. The information 50 transmitted by means of the communications system 20 is received as information 57 from the multifunction display device 4. In doing so the logic output control device 'display control' based on knowledge of an expected message, on the Data_RSP entry in the operation field 61 and the entries 'AIRCON' and #17 recognizes that it is a message intended for the logic output control device 'display control' and is in fact the expected answer.

After receiving all the temperature data to be displayed the multifunction display device 4 displays the mask shown in FIG. 7 with the temperature data of the individual locations in the vehicle interior shown in the control elements 90, 91, 92, 93 and 94, the temperature data relating to currently set temperatures which can be changed by way of the control elements 90, 91, 93 and 94.

The representation as shown in FIG. 7 with the heading 'TEMPERATURE' and the display of the interior 95 of the vehicle 1 makes it clear that the temperature in the vehicle interior can be set individually and referenced to the seat. The control element 90 for the front driver's seat 96 indicates that a setpoint temperature of 19° C. has been set. The control element 93 shows for the front passenger's seat that a setpoint temperature of 20° C. has been set. For the back seats 98 and 99 on the left side a setpoint temperature of 19° C. and on the right side a setpoint temperature of 17° C. have been set. The control element 92 has an assignment, i.e., a function assignment which is shown with 'Back' (to the next higher menu display, that is to say, in this case to the mask as shown in FIG. 4).

In FIG. 7 the multifunction display device 4 displays the control elements 100, 101, 102 and 103 which correspond to the control elements 81, 82, 83, and 84.

The interface module 25 as shown in FIG. 2 in an optional configuration can comprise an information memory 45 for storage of one or more items of information relating to vehicle operation. This information relating to operation of the vehicle 1 is transmitted from the function control 21 to the output control 22, in error-free operation transmission always taking place when the corresponding information relating to operation of the vehicle has changed or when a predetermined repetition time has passed since the last transmission. The repetition time can be different for different information relating to operation of the vehicle. The repetition time is especially more than 1 s.

The interface module 25 comprises, detailed with reference to FIG. 8 in the form of a sample sequence, a monitoring module 46 for monitoring the aforementioned transmission of the information relating to operation of the vehicle. The sample sequence shown in FIG. 8 begins with an query 120 whether a new value for information relating to operation of the vehicle 1 which is to be monitored has been received.

If a new value for information relating to operation of the vehicle 1 which is to be monitored has not been received, the query 120 is followed by the query 122 whether the information relating to operation of the vehicle which is to be monitored has been transmitted the last time within the waiting period from the function control 21 to the output control 22, the waiting period being longer than or equal to the repetition time. The waiting period can be for example twice or three times the repetition time.

If the information relating to operation of the vehicle which is to be monitored has been transmitted the last time within the waiting period from the function control 21 to the output control 22, the query 120 follows the query 122. If conversely the information relating to operation of the vehicle which is to be monitored has not been transmitted (any longer) the last time within the waiting period from the function control 21 to the output control 22, the query 122 is followed by a step 123 in which a memory error variable is set to the ERROR value. Step 123 is followed by step 124 in which a prompt for transmission of the information relating to operation of the vehicle 1 which is to be monitored is sent to the function control 21 from the output control 22. The query 120 follows step 124.

If query 120 results in that a new value for the information relating to operation of the vehicle which is to be monitored has been received, query 120 is followed by step 121 in which the memory error variable is set to a NOERROR value.

If a request for optical display of certain information relating to operation of the vehicle takes place by means of the input device 26 as shown in FIG. 2, the output control device 40 requests this information relating to operation of the vehicle by means of a request 55 according to the interface protocol 50. In the interface module 25 the sequence explained below with reference to FIG. 7 is implemented. It begins with a (cyclic) query 130 whether the information 55 sent from the output control device 40 has been received. If this is the case, query 130 is followed by query 131, otherwise query 130 takes place again.

It is interrogated by means of query 131 whether the requested information relating to operation of the vehicle is information stored in the information memory 45. If the requested information relating to operation of the vehicle is not the information stored in the information memory 45, query 131 is followed by step 133 in which the requested information relating to operation of the vehicle is requested by the function control 21. Then query 130 follows step 133. As soon as the requested information relating to operation of the vehicle is sent from the function control 21 and has been received by the interface module 25, it is made available to the output control device 40.

If the requested information relating to operation of the vehicle is information stored in the information memory 45, query 131 is followed by query 132 whether a memory error variable is set to the ERROR value. If the memory error variable is set to the ERROR value, step 133 is followed by query 133. If conversely the memory error variable is not set to the ERROR value, query 132 is followed by step 134 in which the requested information relating to operation of the vehicle is read out from the information memory 45 and made available to the output control device 40. Query 130 follows step 134.

In this embodiment, an information memory 45 should be provided. Moreover provision should be made such that the setpoint temperatures shown in FIG. 7 are stored in the information memory 45. In this case the information flow shown in FIG. 5 and FIG. 6 is replaced by the information flow displayed in FIG. 10. Triggered by touching or pressing the control element 85 in FIG. 4, information 55 in the interface protocol 60 explained according to FIG. 3 is sent, the operation field 61 containing the DataGet_REQ entry and the ID field 62 containing the entries AIRCON and #17, and the data field 63 being empty or omitted. The logic function control device 'automatic air conditioning' in contrast to the configuration as shown in FIG. 5 does not obtain any corresponding information. Rather the information 57 is produced by means of the communications system 20 based on the corresponding data in the information memory 45 and transferred to the logic output control device 'display control.'

Whether the communications system 20 accesses data from the information memory 45 or sends a request to the corresponding logic function control device 30 depends on the contents of the operation field 61. If for example the content of the operation field 61 is DataSetGet_REQ, the corresponding request is transmitted to the corresponding logic function control device 30, and values from the information memory 45 are not accessed. FIGS. 11 and 12 show a corresponding sample information flow.

Touching or pressing the control element 93 in FIG. 7 calls up a mask which is not shown for changing the setpoint temperature for the passenger seat 97. If the setpoint temperature for the passenger seat 97 is raised for example to 21° C., the logic output control device 'display control' as shown in FIG. 1 sends information 55 in the interface protocol 60 explained according to FIG. 3.

The operation field 61 contains the DataSetGet_REQ entry as a prompt to set the setpoint temperature specified in the ID field 62 by the entries AIRCON and #19 for the passenger's seat 97 to the value 21° C. designated in the data field 63, and to send the new value of the setpoint temperature. The information 55 is received as information from the logic function control device 'automatic air conditioning.' In doing so the operation field 61 contains the DataSetGet_IND entry as a prompt to set the setpoint temperature for the passenger's seat 97 specified in the ID field 62 by the entries AIRCON and #19 to the value 21° C. designated in the data field 63, and to send the new value of the setpoint temperature as confirmation. DataSetGet_IND and DataSetGet_REQ can have the same code and thus cannot be distinguished from one another.

As a reaction, the information 50 shown in FIG. 6 is sent in the information protocol 60 explained according to FIG. 3 from the logic function control device 'automatic air conditioning' which is identified as the 'responsible' logic control device. In this connection, the operation field 61 contains a Data_CNF entry which identifies the information 50 as information for data transmission. The ID field 62 contains the entries AIRCON and #19. The data field 63 contains the value '21° C.' as the new set value for the setpoint temperature. The information 50 transmitted by means of the communications system 20 is received as information 57 from the multifunction display device 4. In this case the logic output control device 'display control' recognizes based on knowledge of an expected message, on the Data_RSP entry in the operation field 61 and the entries 'AIRCON' and #19 that it is a message intended for the logic output control device 'display control' and is in fact the expected answer. After receiving the information 57, the multifunction display device 4 displays the mask shown in FIG. 7, but with the new temperature information 21° C. in the control element 93.

FIG. 13 shows an embodiment for the interface module 23. The interface module 23 is divided into three layers, a BAL layer 150, a BPL layer 151 and a BCL layer 152. The BAL layer 150 comprises the interface 160 to the logic function control device 30. The BAL layer moreover comprises a translation module 153 for translation of the operation field 61 of information 50 and a translation module 154 for translation of the operation field 61 of information 53. The BPL layer 151 comprises a heartbeat function 155 for periodic output of the information relating to operation of the vehicle 1 which is assigned to the logic function control device 30 and which is to be stored in the information memory 45.

The BCL layer 152 comprises a header coding module 165 for adding the header 180 shown in FIG. 14 to the information 50 corresponding to the protocol 60 according to the protocol for communications by way of the bus system 24. The BCL layer 152 comprises moreover a transmission buffer 156 for segmenting the information 50 with the header 180 added into information 51 by means of a segmenting module 166. The BCL layer 152 furthermore comprises a bus interface 161 for output of information 51. FIG. 15 shows an example for segmenting of simple information without a data field. The information shown in FIG. 15 comprises a 1 bit-long header 180 with contents '0', a 3 bit-long operation field 61, a 6 bit-long region 64 and a 6-bit long region 65. The 16 bit information divided into two segments of 1 byte each is transmitted by way of the bus system 24, the separation of the two segments lying in region 64. The BCL layer 152 moreover comprises a receiving buffer 157 for lining up the incoming information 52 and a header decoder module 167 for reduction of a header 180 of combined information 52.

FIG. 16 shows an embodiment for the interface module 25, the same reference numbers as in FIG. 13 designating the same or similar elements. The interface module 25 is divided into three layers, a BAL layer 190, a BPL layer 191 and a BCL layer 192 which corresponds to the BCL layer 152. The BAL layer 190 comprises the interface 160, to the logic output control device 40 and a version matching module 195. The BAL layer 190 moreover comprises a translation module 153 for translation of the operation field 61 of information 55 and a translation module 154 for translation of the operation field 61 of information 58. The BAL layer 190 moreover comprises the information memory 45. The BPL layer 191 comprises a retry timer 196 for a repeated request for information from a function control device 30 when an answer has not been received from the function control device 30 within an answer time. The BPL layer 191 moreover comprises the monitoring model 46.

The elements and fields in the figures are not necessarily drawn to scale, with consideration of simplicity and clarity. Thus for example the magnitudes of some elements or fields are shown exaggerated compared to other elements and fields in order to improve the understanding of embodiments of this invention.

| REFERENCE NUMBER LIST | |
|---|---|
| 1 | motor vehicle |
| 2 | engine control |
| 3 | combination display |
| 4 | multifunction display device |
| 5 | acoustic output device |

-continued

REFERENCE NUMBER LIST

| | |
|---|---|
| 6 | air conditioning system |
| 7 | navigation system |
| 8 | music module |
| 9 | telephone module |
| 24 | bus system |
| 14 | sensor |
| 15 | actuator |
| 20 | communications system |
| 21 | function control |
| 22 | output control |
| 23, 25 | interface module |
| 26 | input device |
| 27 | display |
| 30 | logic function control device |
| 31, 32, 33, 41, 42, 43 | function module |
| 40 | logic output control device |
| 45 | information memory |
| 46 | monitoring module |
| 50, 51, 52, 53, 55, 56, 57, 58 | information |
| 54 | request signal |
| 59 | display control signal |
| 60 | protocol |
| 61 | operation field |
| 62 | ID field |
| 63 | data field |
| 64, 65 | region |
| 81, 82, 83, 84 85, 90, 91, 92, 93, 94, 100, 101, 102, 103 | control element |
| 95 | display of interior of a motor vehicle |
| 96 | vehicle driver's seat |
| 97 | passenger seat |
| 98, 99 | back seat |
| 120, 122, 130, 131, 132, | query |
| 121, 123, 124, 133, 134 | step |
| 150, 190 | BAL layer |
| 151, 191 | BPL layer |
| 152, 192 | BCL layer |
| 153, 154 | translation module |
| 155 | heartbeat function |
| 156 | transmission buffer |
| 157 | receiving buffer |
| 160 | interface to function control or to output control |
| 161 | bus interface |
| 165 | header coding module |
| 166 | segmenting module |
| 167 | header decoding module |
| 180 | header |
| 195 | version matching module |
| 196 | retry timer |
| M | measurement signal |
| S | control signal |

The invention claimed is:

1. Communications system for a motor vehicle for transmission of information relating to operation of the vehicle from a sending control device to a receiving control device, the communications system comprising an interface for input or output of the information relating to operation of the motor vehicle, wherein communications is possible by way of the interface by means of a protocol which comprises
an operation field identifying a task to be performed by means of the information relating to operation of the vehicle,
a data field with a value for the information relating to operation of the vehicle, and
an ID field comprising
a first region designating a logic control device to which the information relating to operation of the motor vehicle is assigned, and
a second region identifying the information relating to operation of the motor vehicle, and
wherein the information is transmitted when a predetermined repetition time has passed since the last transmission, and
the predetermined repetition time is different for different information relating to the operation of the vehicle.

2. The communications system as claimed in claim 1, wherein the operation field comprises information which indicates whether the protocol relates to a message to be sent or a received message.

3. The communications system as claimed in claim 1, wherein the operation field comprises an information field for identifying a message to be sent or a received message.

4. The communications system as claimed in claim 3, wherein the protocol comprises at most the operation field, a data field with a value for the information relating to operation of the vehicle, an ID field for identification of the information relating to operation of the vehicle, and the information field.

5. The communications system as claimed in claim 1, wherein the ID field designates a function which is assigned to the information relating to operation of the vehicle or from which the information relating to operation of the vehicle is produced or processed.

6. The communications system as claimed in claim 1, wherein the protocol does not comprise a designation of the sending control device.

7. The communications system as claimed in claim 1, wherein the protocol does not comprise a designation of the receiving control device.

8. Communications system for a motor vehicle for transmission of information relating to operation of the vehicle from a sending control device to a receiving control device, the communications system comprising a bus system,
wherein the communications system comprises an interface which is independent of the configuration of the bus system for input of the information relating to operation of the vehicle transmitted by way of the bus system and/or output of the information relating to operation of the vehicle to be transmitted by way of the bus system,
wherein by way of the bus system a bus protocol is transmitted which is composed essentially of an interface protocol of the interface and data which are specific to the bus system, and
wherein the interface protocol comprises
an operation field identifying a task to be performed by means of the information relating to operation of the vehicle,
a data field with a value for the information relating to operation of the vehicle, and
an ID field comprising
a first region designating a logic control device to which the information relating to operation of the motor vehicle is assigned, and
a second region identifying the information relating to operation of the motor vehicle, and
wherein the information is transmitted when a predetermined repetition time has passed since the last transmission, and
the predetermined repetition time is different for different information relating to the operation of the vehicle.

9. The communications system as claimed in claim 8, wherein by way of the bus system a bus protocol is transmitted which is composed of an interface protocol of the interface and prefixed data which are specific to the bus system.

10. The communications system as claimed in claim 8, wherein the operation field comprises information which indicates whether the protocol relates to a message to be sent or a received message.

11. The communications system as claimed in claim 8, wherein the interface protocol comprises an information field for identifying a message to be sent or a received message.

12. The communications system as claimed in claim 8, wherein the ID field designates a function which is assigned to the information relating to operation of the vehicle or from which the information relating to operation of the vehicle is produced or processed.

13. The communications system as claimed in claim 8, wherein the interface protocol does not comprise a designation of the sending control device.

14. The communications system as claimed in claim 8, wherein the interface protocol does not comprise a designation of the receiving control device.

15. The communications system as claimed in claim 1, wherein the operation field comprises a request for sending of a current value of the information relating to operation of the vehicle.

16. The communications system as claimed in claim 1, wherein the operation field comprises a prompt for changing the information relating to operation of the vehicle.

17. The communications system as claimed in claim 1, wherein the operation field comprises a prompt for confirming a change of the information relating to operation of the vehicle.

18. The communications system as claimed in claim 1, wherein the operation field comprises an identification of sending of the current value of the information relating to operation of the vehicle.

19. The communications system as claimed in claim 1, wherein the operation field comprises identification of a restart of a function assigned to information relating to operation of the vehicle.

20. The communications system as claimed in claim 1, wherein the operation field comprises an identification of an error to be assigned to the information relating to operation of the vehicle.

21. The communications system as claimed in claim 1, comprising an information memory for storage of the information relating to operation of the vehicle.

22. Communications system for a motor vehicle for transmission of the information relating to operation of the vehicle from a first control device to a second control device, the communications system comprising an interface for input and/or output of the information relating to operation of the motor vehicle, wherein communications is possible by way of the interface by means of a protocol which comprises
   an ID field identifying a function which is assigned to the information relating to operation of the vehicle, the contents of the ID field being independent of whether transmission takes place from the first control device to the second control device or from the second control device to the first control device,
   an operation field identifying a task to be performed by means of the information relating to operation of the vehicle, and
   a data field with a value for the information relating to operation of the vehicle, and
   wherein the information is transmitted when a predetermined repetition time has passed since the last transmission, and
   the predetermined repetition time is different for different information relating to the operation of the vehicle.

23. Control module for control of a function of the motor vehicle, the control module comprising an interface for input and/or output of the information relating to operation of the vehicle, wherein communications is possible by way of an interface, especially only by means of a protocol which comprises
   an operation field identifying the task to be performed by means of the information relating to operation of the vehicle
   a data field with a value for the information relating to operation of the vehicle, and
   an ID field comprising
   a first region designating a logic control device to which the information relating to operation of the motor vehicle is assigned, and
   a second region identifying the information relating to operation of the motor vehicle, and
   wherein the information is transmitted when a predetermined repetition time has passed since the last transmission, and
   the predetermined repetition time is different for different information relating to the operation of the vehicle.

24. The control module as claimed in claim 23, wherein the operation field comprises information which indicates whether the protocol relates to a message to be sent or a received message.

25. The control module as claimed in claim 23, wherein the protocol comprises an information field for identification of a message to be sent or a received message.

26. The control module as claimed in claim 23, wherein the ID field designates a function which is assigned to the information relating to operation of the vehicle or from which the information relating to operation of the vehicle is produced or processed.

27. The control module as claimed in claim 23, wherein the control module is implemented on a control device, the protocol not comprising a designation of the control device.

28. Control module for control of a function of the motor vehicle or for output of the information relating to operation of the vehicle, the control module comprising an interface for input and/or output of the information relating to operation of the vehicle, wherein communications is possible by way of an interface by means of a protocol which comprises
   an ID field identifying the function which is assigned to the information relating to operation of the vehicle, the contents of the ID field being independent of whether the information from the control module is being sent or received,
   an operation field identifying a task to be performed by means of the information relating to operation of the vehicle, and
   a data field with a value for the information relating to operation of the vehicle, and
   wherein the information is transmitted when a predetermined repetition time has passed since the last transmission, and
   the predetermined repetition time is different for different information relating to the operation of the vehicle.

29. Motor vehicle, comprising a communications system as claimed in claim 1.

30. The motor vehicle as claimed in claim 29, comprising a control module as claimed in claim 23.

31. The motor vehicle of claim 29, comprising a control module as claimed in claim 23.

32. A method of transmitting information in a motor vehicle through a communication system, the method comprising: transmitting the information from a sending control device; receiving the transmitted information in a receiving control device; wherein: the information is inputted into and/or outputted by the communication system through an interface by operating a protocol; and the protocol comprises identifying an operation field, the operation field corresponding to a task to be performed in response to the information, identifying a data field with a value corresponding to the operation field, and identifying an ID field comprising a first region designating a logic control device to which the information relating to operation of the motor vehicle is assigned, and a second region identifying the information relating to operation of the motor vehicle, and wherein the information is transmitted when a predetermined repetition time has passed since the last transmission, and the predetermined repetition time is different for different information relating to the operation of the vehicle.

33. The method of claim 32, wherein the protocol comprises a field indicating whether the protocol relates to inputted and/or outputted information.

34. The method of claim 32, comprising varying a display depending upon the information.

35. The method of claim 32, wherein the inputted information relates to a condition of at least one selected from the group consisting of air conditioning, navigation system, music module, telephone module, and acoustic output device.

36. The method of claim 32, wherein the outputted information relates to a condition of at least one selected from the group consisting of engine rpm, oil pressure, coolant temperature, vehicle tilt, distance to an obstacle, interior temperature, geographical location of the vehicle, vehicle doors, time, telephone book entry, and music title.

* * * * *